United States Patent
Klamt et al.

(10) Patent No.: US 7,312,551 B2
(45) Date of Patent: Dec. 25, 2007

(54) COIL FOR A DYNAMO ELECTRIC MACHINE

(75) Inventors: Thomas Klamt, Schinznach-Dorf (CH); Ulrich Wagner, Muelligen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/961,047

(22) Filed: Oct. 12, 2004

(65) Prior Publication Data

US 2005/0140239 A1    Jun. 30, 2005

Related U.S. Application Data

(63) Continuation of application No. PCT/EP03/50088, filed on Apr. 2, 2003.

(30) Foreign Application Priority Data

Apr. 11, 2002 (DE) ............................... 102 15 937

(51) Int. Cl.
    *H02K 17/00* (2006.01)
(52) U.S. Cl. ...................... 310/208; 310/179
(58) Field of Classification Search .............. 310/179, 310/180, 200, 201, 202, 203, 208
    See application file for complete search history.

(56) References Cited

U.S. PATENT DOCUMENTS

| | | | | |
|---|---|---|---|---|
| 1,826,296 | A * | 10/1931 | Apple | 310/201 |
| 3,634,708 | A * | 1/1972 | Fisher | 310/195 |
| 3,749,950 | A * | 7/1973 | Lenz | 310/45 |
| 4,207,482 | A * | 6/1980 | Neumeyer et al. | 310/45 |
| 4,385,254 | A | 5/1983 | Vakser et al. | 310/260 |
| 4,635,350 | A * | 1/1987 | Olsen et al. | 29/598 |
| 4,658,169 | A | 4/1987 | Eckerrot et al. | 310/208 |
| 5,714,824 | A * | 2/1998 | Couture et al. | 310/208 |
| 5,777,417 | A | 7/1998 | Haldemann | 310/201 |
| 5,789,840 | A | 8/1998 | Gould et al. | 310/179 |

FOREIGN PATENT DOCUMENTS

| | | |
|---|---|---|
| DE | 932 972 | 9/1955 |
| DE | 29 06 554 | 8/1980 |
| DE | 695 04 674 T2 | 5/1999 |
| EP | 0 074 020 A1 | 3/1983 |
| JP | 56041754 | 4/1981 |
| JP | 06225503 | 8/1994 |
| WO | 03/085803 A1 | 10/2003 |

OTHER PUBLICATIONS

Search Report from DE 102 15 937.8 (Dec. 16, 2002).
Search Report from PCT/EP 03/50088 (Aug. 24, 2004).
Search Report from PCT/EP 03/50088 (Aug. 5, 2003).

* cited by examiner

*Primary Examiner*—Dang Le
*Assistant Examiner*—Nguyen N. Hanh
(74) *Attorney, Agent, or Firm*—Adam J. Cermak; Cermak Kenealy & Vaidya LLP

(57) ABSTRACT

A coil (20) for a dynamo electric machine, particularly for the stator (33) of a hydro-generator, includes a plurality of coil rods (22, 24), running in the axial direction in a sheet metal package, whose rod ends (23, 23'; 25, 25'), which protrude from the sheet metal package, are bent from the axial direction and connected with each other, in pairs, at connection points (26, 26'). In the case of such a coil, simplified manufacturability is achieved by virtue of the fact that the rod ends (23, 23'; 25, 25'), in each case, include several straight sections (28, 30), which are separated from each other by intervening crimps (29, 29'; 32, 34).

5 Claims, 4 Drawing Sheets

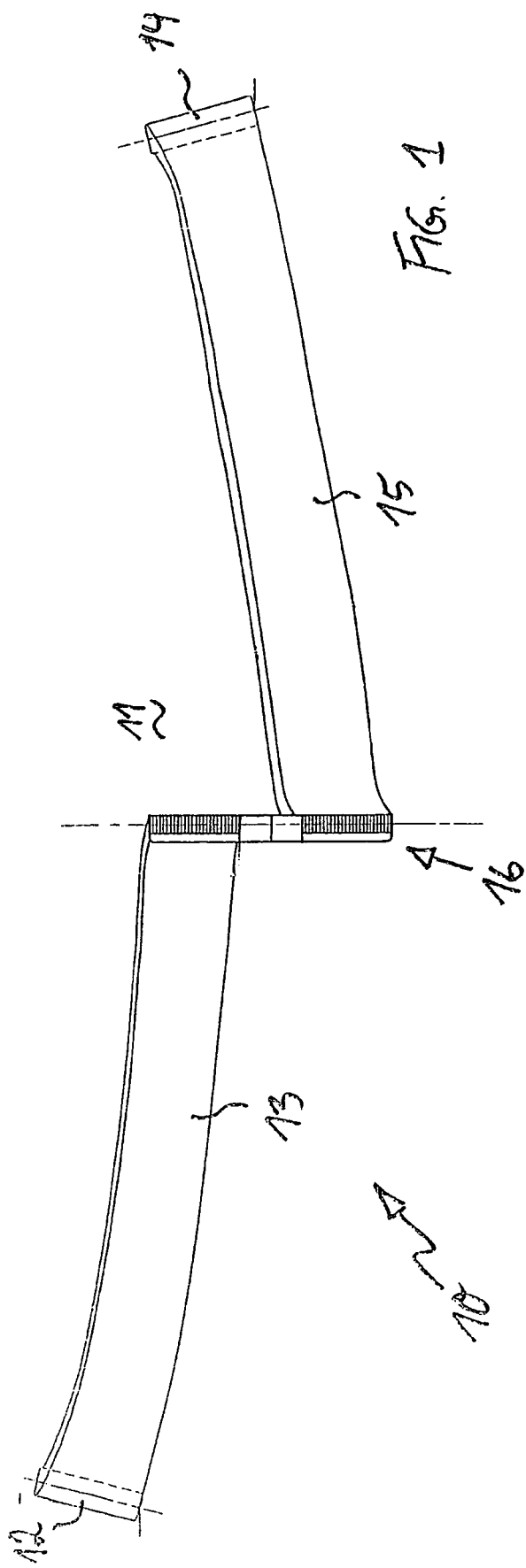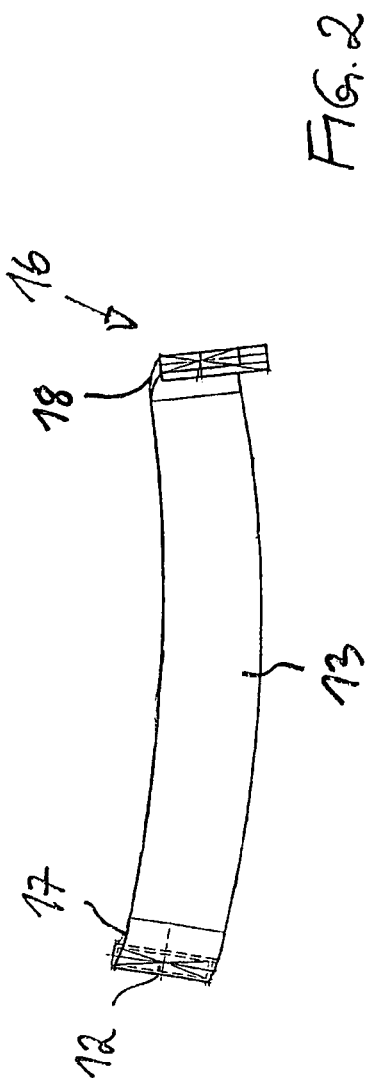
Fig. 1
Fig. 2

COIL FOR A DYNAMO ELECTRIC MACHINE

This application is a Continuation of, and claims priority under 35 U.S.C. § 120 to, International application number PCT/EP03/050088, filed 2 Apr. 2003, and claim priority under 35 U.S.C. § 119 to German application number 102 15 937.8, filed 11 Apr. 2002, the entireties of both of which are incorporated by reference herein.

BACKGROUND OF THE INVENTION

1. Field of the Invention

The present invention relates to the field of electrical rotating machines. It pertains to a coil for a dynamo electric machine.

Such a coil is known, for example, from the printed publication U.S. Pat. No. 5,777,417 (FIG. 1) or the printed publication U.S. Pat. No. 4,385,254.

2. Brief Description of the Related Art

The stator coil of a hydro-generator consists of so-called Roebel rods (see, for example, U.S. Pat. No. 5,777,417, which was mentioned at the outset), which are produced from several individual copper sub-conductors. In most instances, a coil consists of an upper layer and a lower layer, thus, two rods, that lie one above the other in an (axial) groove of the sheet metal body of the stator. For the circuitry of the generator coil, the ends of these rods (rod ends) must be bent, both tangentially and radially, in point of fact. These worked rod ends are designated as brackets, or are generally referred to as the head of the coil. The bends in the head of the coil are constructed in accordance with certain guidelines of the requisite electrical clearances and so-called incrementation. In this case, the incrementation designates the number of grooves that a rod "steps across."

Depicted in FIGS. 1 and 2 is a section of such a coil head 11 of a coil 10 (FIG. 1), which is known from the state of the art, as well as one bent rod end of a single coil rod, in horizontal projection in the direction of the machine's axis. The coil rods, which run in the axial direction in the sheet metal body of the stator, of which two selected coil rods, 12, 14 are depicted in FIG. 1, are connected to one another in pairs in the coil head. This occurs at a connection point 16, which, viewed in the axial direction, lies within a central area between the coil rods, 12, 14. The rod ends 13, 15, which protrude from the sheet metal body of the stator are, in addition, initially bent around in a first tangential bend (17 in FIG. 2) from the axial direction in the direction of the connection point 16 and shortly ahead of the connection point 16, bent back in a second tangential bend (18 in FIG. 2), again in the axial direction. The bent back terminal sections of the rod ends, 13, 15 come, in the process, to lie above one another in the connection point 16.

The middle levels of the coil rods 12, 14, which are drawn as dashes in FIG. 1, which run in the radial direction, and the connection point 16, enclose, in each case, an angle in the process that is all the greater, the greater the aforementioned step width turns out to be. The rod ends 13, 15, as may be seen particularly clearly in FIG. 2, are provided, between the tangential bends 17 and 18, with a continuous, constant curving (bend), so that the configuration of rod ends depicted in FIGS. 1 and 2 can be realized. In the state of the art, these bends are produced by hand by means of a bending tool. This type of shaping, however, has the disadvantage that it takes great effort to perform. In particular, it is necessary to obtain a new bending tool, which is, in most instances, a piecework production, for each generator, since the construction of the coil rods is different every time.

SUMMARY OF THE INVENTION

It is, therefore, the task of the invention to create a coil that can, by reason of its selected configuration, be produced more easily and more flexibly.

The task is resolved by the totality of the characteristics of claim 1. Particular embodiment types of the invention are reflected in the dependent claims.

The core of the invention, in the case of the rod ends, consists of embodying several straight sections, which are separated from one another by crimps that lie between them instead of the uniform curving (bend). In this instance, the term crimp is taken to mean a comparatively narrow (sharp) bend with a small bending radius, in the range of a few cm. Such crimps can be introduced to the rod ends in a simple and flexible manner by means of a machine, so that various configurations of coil heads can be realized easily in the case of various machines without expending additional effort or funds.

An exemplary embodiment of the present invention is distinguished by virtue of the fact that the connecting point of a pair of coil rods is arranged between the coil rods, that the rod ends, in each case, are bent, in an initial tangential bend, from the axial direction toward the connection point, and shortly in front of the connection point, in a second tangential bend back in the axial direction, and that the rod ends comprise, in each case, between the two tangential bends, at least two straight sections, which are separated from each other by means of a crimp. By these means, most coil head configurations can be covered in a particularly simple manner.

In particular, the rod ends of the coil's rods run between the tangential bends, in each case, substantially in one plane, and the crimp between the straight sections, at least two of them, also lies in this plane.

Exemplarily, the coil rods exhibit a cross-section in the form of an elongated rectangle, the coil rods are oriented within the sheet metal package with the longitudinal sides of their cross-section oriented in the radial direction, and the rod ends of the coil rods are oriented between the tangential bends, with their longitudinal sides oriented parallel to the plane in which the rod ends (23, 23'; 25, 25') run.

It has been proven of value when the crimp exhibits an angle of crimp between greater than 0° and 20,° preferably an angle of crimp between 14° and 17°.

BRIEF DESCRIPTION OF THE DRAWINGS

The invention is to be elucidated in greater detail below by virtue of the embodiments, in conjunction with the drawings.

FIG. 1, in a horizontal projection, in the direction of the machine's axis shows a pair of coil rods of a hydrogenerator's stator, which are joined at the head of the coil in accordance with the state of the art.

FIG. 2 shows the bent rod end of an individual rod from FIG. 1.

DETAILED DESCRIPTION OF EXEMPLARY EMBODIMENTS

Figure 3:
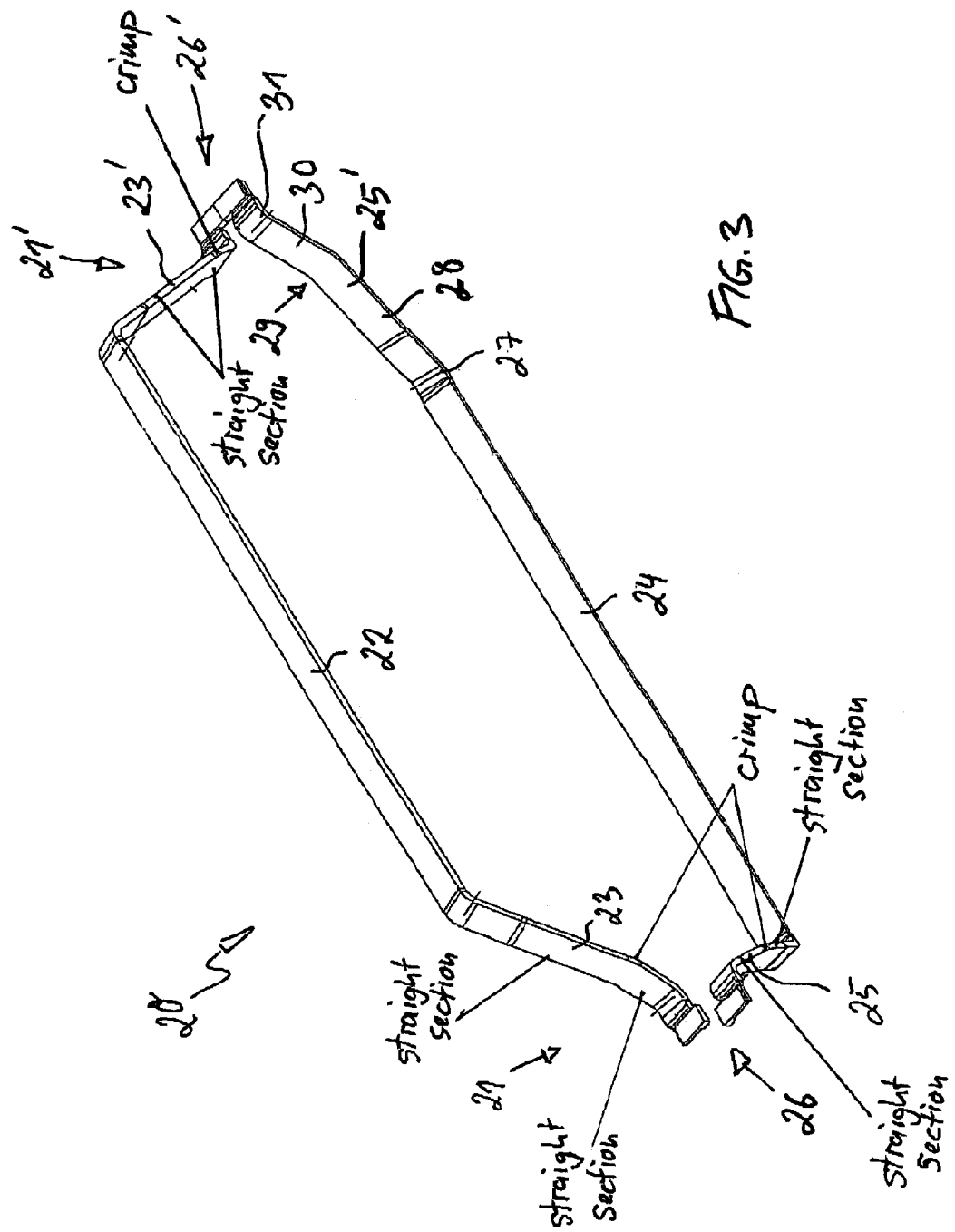
FIG. 3 shows, in a perspective view, a pair of coil rods in their bent configuration, for use in the stator of a hydrogenerator, according to an exemplary embodiment of the invention.

In FIG. 3, in a perspective view, a pair of coil rods is shown, in their bent configuration, for use in the stator of a hydro-generator, according to an exemplary embodiment of the present invention. The coil rods 22 and 24 are part of a coil 20, which consists of a multiplicity of rods. The coil rods 22, 24 have a straight center section that runs parallel to the machine's axis, and with which the rods are accommodated in corresponding grooves in the stator sheet metal package and fastened by wedges. As a rule, two coil rods are arranged above each other per groove, as is shown in FIG. 1 of U.S. Pat. No. 4,385,254.

The coil rods 22, 24, make the transition, on either side, to corresponding rod ends 23, 23' or 25, 25,' respectively, which lie outside the stator's sheet metal package and are connected to each other, in pairs, within a coil head, 21 or 21,' respectively, in order to form a coil with a multiplicity of windings. In FIG. 3, the rod ends 23', 25' of the two coil rods 22, 24 are connected, in the right coil head, 21,' to each other at one connection point, 26'. In the left coil head 21, the rod ends 23, 25 are connected, in each case with other rod ends at one connection point 26, or with connectors or charge eliminators that are not depicted.

Figure 4:
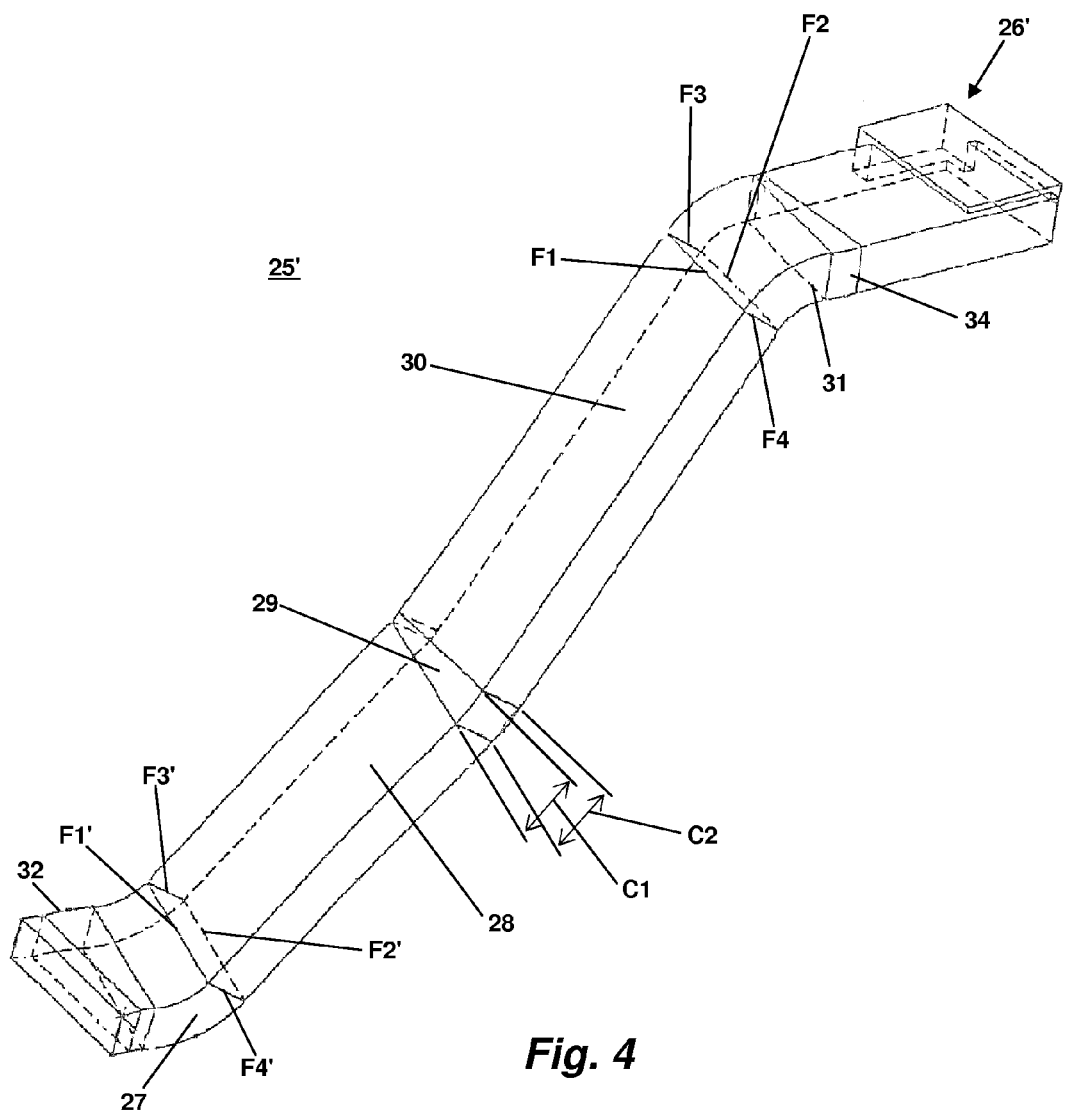
FIG. 4 shows, in a magnified representation, the right rod end of the lower coil rod of the configuration from FIG. 3.

As was already mentioned at the outset, the rod ends are repeatedly bent toward the connection points 26, 26,' in order to render a corresponding connection between the coil rods possible. The configuration of the rod ends 23, 23' or 25, 25,' according to the invention, can be elucidated in greater detail by virtue of the example of the rod end, 25' from FIG. 3 and FIG. 4. The rod end 25,' in turn, is bent with an initial tangential bend 27 from the axial direction toward the connection point 26', and with a second tangential bend 31 shortly ahead of the connection point 26,' back again to the axial direction. Between the tangential bends 27, 31, the rod end 25' is straight in some sections, that is, it is comprised of straight sections 28, 30, which are separated (or rather, connected to each other) by a (comparatively sharp) crimp 29. As has already been mentioned farther above, the crimp 29 is actually a narrow bend, which, on the inside, exhibits a bending radius of 30 or 60 mm, for example. In the example of FIGS. 3, 4, only two straight sections 28, 30 are present, which are separated only by a crimp 29. It is self-understood, however, that depending upon the overall configuration, additional straight sections and crimps can be provided. An additional crimp 32 can also be present between the first tangential bend 27 and the actual coil rod 24. The same applies to a crimp 34 behind the second tangential bend 31.

FIG. 4 illustrates sections 28 and 30, which are themselves rectangular and each have a rectangular cross-section. Section 28 has two pairs of parallel sides F1', F2' and F3', F4'. Section 30 also has two pairs of parallel sides F1, F2 and F3, F4. The sections 28 and 30 are connected by crimp 29, which has identical crimping angles c1 and c2 (c1=c2) between the planes E1-E1' and F2-F2'. Therefore, the planes containing sides E1 and F2 are necessarily conserved during crimping, that is, the sides F1 and F1', as well as the sides E2, F2', lie in the same plane, while the sides F3 and F3', as well as F4 and F4', lie in different planes.

Figure 5:
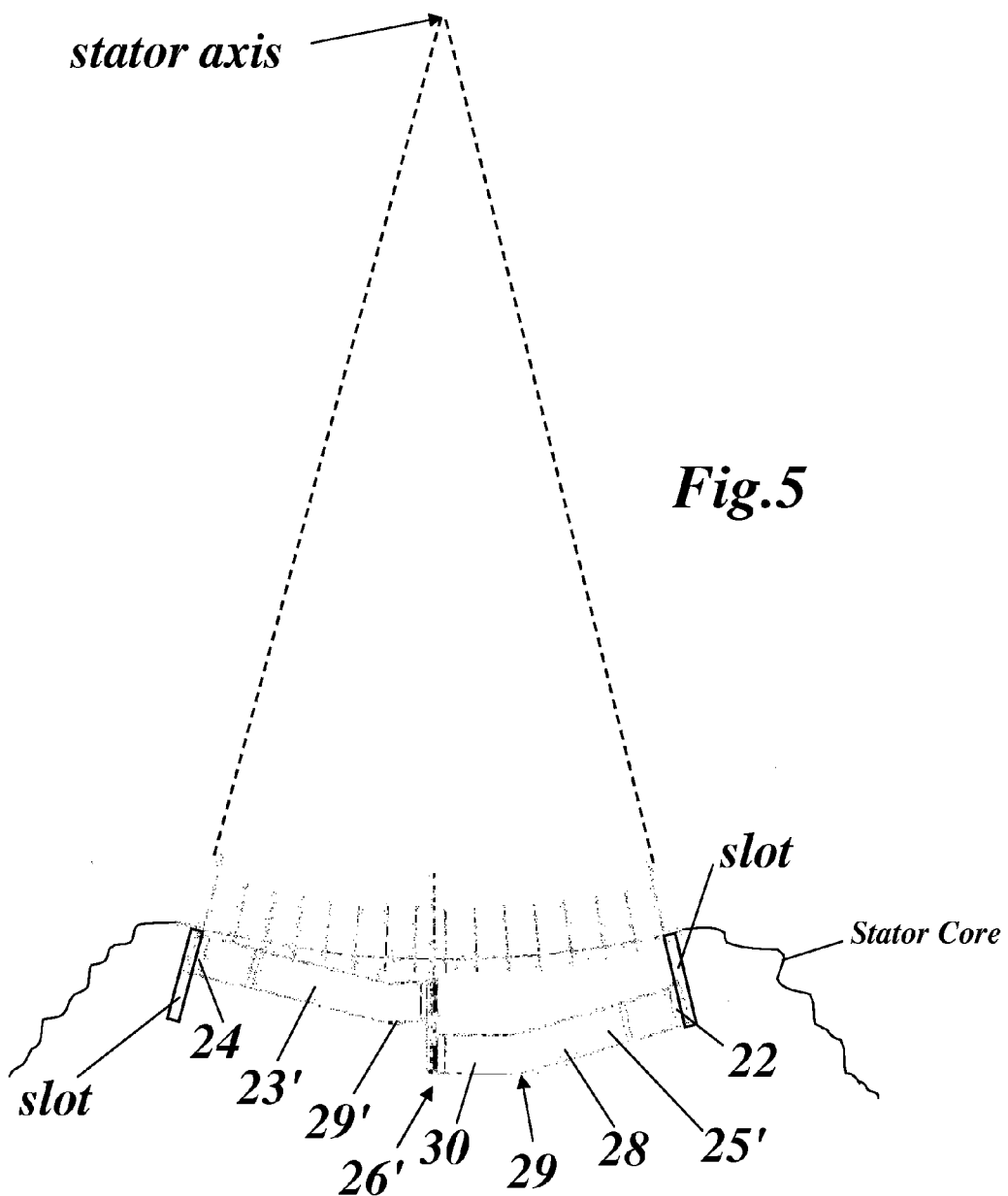
FIG. 5 shows the connection of the two coil rods from FIG. 3 in the right coil head in horizontal projection, in the direction of the axis of the machine.

Viewed in the axial direction, at connection point 26', the configuration depicted in FIG. 5 results with respect to the two coil rods 22, 24 of the stator 33. In the case of rod end 23', the crimp 29' corresponds to the crimp 29 of rod end 25,' which is provided between the straight sections 28 and 30. The crimps 29, 29', 32, 34 are exemplarily introduced to the coil rods or rod ends, respectively, by mechanical means. They can, if necessary, exhibit differing angles of crimp. In practice, overall, angles of crimp between greater than 0° and 20° have proven their value. Angles of crimp between 14° and 17° have particularly proven their value. The coil rods 22, 24 have a cross-section in the form of an elongated rectangle. Whereas, within the sheet metal package, they are oriented with the longitudinal sides of their cross-section in the radial direction, the rod ends 23, 23'; 25, 25' of the coil rods 22, 24 are oriented between the tangential bends 27, 31, with their longitudinal sides parallel to the plane in which the rod ends 23, 23.' 25, 25' run. In each case, the crimps lie in this plane.

LIST OF REFERENCE SYMBOLS

10 Coil
11 Coil head
12, 14 Coil rod (Stator rod)
13, 15 Rodends
16 Connection point
17, 18 Tangential bend
20 Coil
21, 21' Coil head
22, 24 Coil rod (Stator rod)
23, 23' Rod end
25, 25' Rod end
26, 26' Connection point
27, 31 Tangential bend
28, 30 Straight section
29, 29', 32, 34 Crimp
33 Stator While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

The invention claimed is:

1. A stator of a dynamo-electric machine, the stator comprising:
a stator core with a plurality of radial slots extending in an axial direction;
a plurality of coil rods arranged within said plurality of radial slots, the plurality of coil rods having rod ends which protrude from the stator core and are bent from the axial direction and are connected with each other in pairs at connection points;
wherein the coil rods each have a rectangular cross-section with two pairs of parallel sides;
wherein the rod ends each comprise several straight sections that are separated from one another by intervening crimps; and
wherein at least two adjacent sections of said straight sections and an intervening crimp lie in a common plane which is parallel to one of said pair of parallel sides of said rectangular cross-section.

2. A stator according to claim 1, wherein the connection point of a pair of coil rods is arranged between the coil rods;
wherein the rod ends are each bent around in a first tangential bend from the axial direction toward the connection point and are bent shortly ahead of the connection point in a second tangential bend back in the axial direction; and
wherein the rod ends, between both tangential bends in each case, comprise at least two straight sections that are separated from each other by a crimp.

3. A stator according to claim 1, wherein the crimp has an angle of crimp between 0° and 20°.

4. A stator according to claim 3, wherein the crimp has an angle of crimp between 14° and 17°.

5. A stator according to claim 1, wherein the dynamo-electric machine is a hydro-generator.

* * * * *